United States Patent
Tell

(10) Patent No.: US 8,534,633 B2
(45) Date of Patent: Sep. 17, 2013

(54) SUCTION CUP HAVING REPLACEABLE SEALING SURFACES

(75) Inventor: Peter Tell, Akersberga (SE)

(73) Assignee: Xerex AB, Taby (SE)

( * ) Notice: Subject to any disclaimer, the term of this patent is extended or adjusted under 35 U.S.C. 154(b) by 1 day.

(21) Appl. No.: 13/258,587

(22) PCT Filed: Feb. 2, 2010

(86) PCT No.: PCT/SE2010/050120
§ 371 (c)(1),
(2), (4) Date: Sep. 22, 2011

(87) PCT Pub. No.: WO2010/110719
PCT Pub. Date: Sep. 30, 2010

(65) Prior Publication Data
US 2012/0025053 A1   Feb. 2, 2012

(30) Foreign Application Priority Data

Mar. 27, 2009 (SE) ...................................... 0900401

(51) Int. Cl.
*A45D 42/14* (2006.01)
*F16B 47/00* (2006.01)
*A01K 97/10* (2006.01)
*B66C 1/00* (2006.01)
*B65G 1/133* (2006.01)

(52) U.S. Cl.
USPC ..... 248/363; 248/537; 248/205.5; 248/205.8; 248/309.3; 248/205.7; 248/206.2; 248/362; 414/736; 414/752.1; 901/40; 269/20; 269/21

(58) Field of Classification Search
USPC ................ 248/638, 537, 205.5, 205.8, 309.3, 248/737, 205.6, 205.7, 206.2, 362–363; 414/736, 752.1; 901/40; 269/20–21
See application file for complete search history.

(56) References Cited

U.S. PATENT DOCUMENTS

| 2,597,543 | A | * | 5/1952 | Suben | ........................... | 451/388 |
| 3,875,941 | A | * | 4/1975 | Adair | ........................... | 604/540 |

(Continued)

FOREIGN PATENT DOCUMENTS

| CN | 101265939 A | 9/2008 |
| GB | 801914 | 9/1958 |

(Continued)

OTHER PUBLICATIONS

European Office Action, dated Oct. 24, 2012, from corresponding European application.

(Continued)

*Primary Examiner* — Terrell McKinnon
*Assistant Examiner* — Christopher Garft
(74) *Attorney, Agent, or Firm* — Young & Thompson

(57) ABSTRACT

A suction cup for a tool driven by vacuum is presented, the suction cup in a first or upper end arranged to be brought into fluid flow communication with a vacuum source and in its opposite end arranged to be brought tightly into contact with the surface of an object to be handled. The suction cup is in its lower end arranged to be coupled to a sealing ring having a sealing surface arranged between an outer periphery and a through-opening defined by an inner periphery, and the sealing ring in the region of its inner periphery having a lip arranged to engage with the suction cup, to which purpose the suction cup in its lower end has a circumferentially running groove) in which the peripheral region and the lip of the sealing ring is insertable under form fitting engagement and in a radially overlapping relation between the groove and the lip in the region (r) of engagement.

9 Claims, 2 Drawing Sheets

(56) References Cited

U.S. PATENT DOCUMENTS

| | | | | |
|---|---|---|---|---|
| 4,717,138 A | * | 1/1988 | Watkiss | 271/103 |
| 4,787,812 A | * | 11/1988 | Gopfert | 414/737 |
| 4,955,493 A | * | 9/1990 | Touzani | 215/372 |
| 5,639,553 A | * | 6/1997 | Nagai et al. | 428/409 |
| 5,882,055 A | | 3/1999 | Smith | |
| 6,382,692 B1 | * | 5/2002 | Schmalz et al. | 294/189 |
| 6,588,718 B2 | * | 7/2003 | Kalb | 248/205.5 |
| 6,612,633 B1 | * | 9/2003 | Tell | 294/186 |
| 7,364,521 B2 | * | 4/2008 | Yang | 473/578 |
| 7,607,622 B2 | * | 10/2009 | Carnevali | 248/205.8 |
| 7,901,164 B2 | * | 3/2011 | Skradski et al. | 408/67 |
| 8,096,537 B2 | * | 1/2012 | Browne et al. | 269/21 |
| 8,251,340 B2 | * | 8/2012 | Webb et al. | 248/683 |
| 2004/0231607 A1 | * | 11/2004 | Hollinger | 119/61.54 |
| 2007/0065242 A1 | * | 3/2007 | Skradski et al. | 408/67 |
| 2007/0075196 A1 | * | 4/2007 | Richter | 248/205.8 |
| 2007/0243031 A1 | * | 10/2007 | Yun | 408/67 |
| 2008/0078896 A1 | * | 4/2008 | Browne et al. | 248/205.8 |
| 2009/0057971 A1 | | 3/2009 | Bumgarner et al. | |
| 2012/0025053 A1 | * | 2/2012 | Tell | 248/363 |

FOREIGN PATENT DOCUMENTS

| | | |
|---|---|---|
| GB | 1 000 156 A | 8/1965 |
| JP | 8-188277 A | 7/1996 |

OTHER PUBLICATIONS

International Search Report dated Jun. 30, 2010, corresponding to PCT/SE2010/050120.

Chinese Search Report dated Apr. 10, 2013, from corresponding CN application.

* cited by examiner

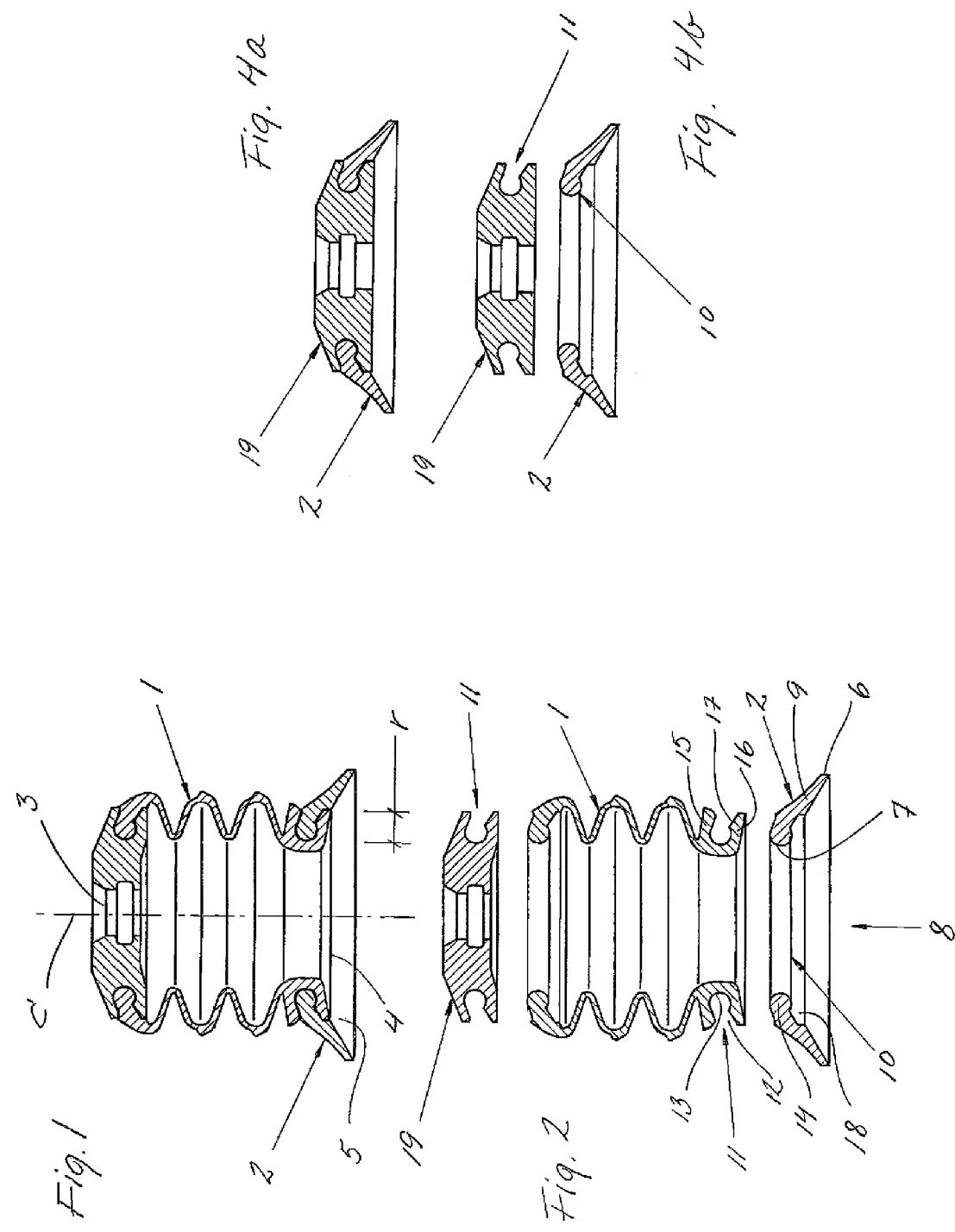

SUCTION CUP HAVING REPLACEABLE SEALING SURFACES

TECHNICAL FIELD OF THE INVENTION

This invention relates to a suction cup for a tool driven by vacuum, said suction cup in a first or upper end arranged to be brought into fluid flow communication with a vacuum source and in its opposite end arranged to be brought tightly into contact with the surface of an object to be handled. The invention further relates to a system including a set of mutually compatible and elements which can be combined as desired and which are arranged to be assembled to suction cups for various uses, as well as to an end piece, a bellows and a sealing ring comprised in the aforesaid set of elements.

BACKGROUND OF THE INVENTION AND PRIOR ART

Initially it shall be explained that the term "vacuum" as used in this description shall be understood as a pressure below ambient atmospheric pressure and which is effective to produce between the suction cup and the object the holding force that is required to fixate, to lift and to move the object. The term vacuum shall thus be understood in a broader sense than in terms of an absolute pressure-less condition.

A negative pressure for driving a tool with a suction cup according to the invention can be provided using a motor-driven pump or a compressed air driven ejector in a manner known per se. The negative pressure is typically discharged to a suction cup which is supported by a tool, such as a lifting means which is arranged mobile and operated and controlled for lifting and moving of an object, or by a tool that is designed to keep the object fixed in a certain position. In many applications it is advantageous to arrange a flexible bellows between the tool and the suction cup, such as when a particularly gentle application of the suction cup to the object is desirable or if the object's surface is uneven and has level differences.

Suction cups of this type which are fitted with bellows are often made with a sealing surface formed integrally with the bellows and brought into sealing contact with the surface of the object. This sealing surface is subjected to wear, and shall in respect of its properties such as softness, flexibility and ability not to impose marks on the object be adapted to the subject object. The properties of the sealing surface therefore often differ from the desired properties of the bellows in the form of elasticity combined with strength and stability. The desired characteristics of the bellows and the sealing surface can be integrated into an individual suction cup through a double-casting process, e.g., which at the same time results in that the entire suction cup must be discarded when the sealing surface is worn out, or needs to be replaced by another suction cup upon a change in production, e.g.

SUMMARY OF THE INVENTION

The invention aims to overcome this problem and provide a suction cup with improved versatility and the ability to be adapted for different applications and needs.

The object is met in a suction cup of as initially described wherein the suction cup in its lower end is arranged to be coupled to a sealing ring having a sealing surface arranged between an outer periphery and a through-opening defined by an inner periphery, and the sealing ring in the region of its inner periphery comprising a lip that engages with the suction cup, the suction cup in its lower end comprising a circumferentially running groove in which the peripheral region of the sealing ring is insertable under form fit and in a radially overlapping relation between the groove and the lip in the region of engagement.

This way a replaceable sealing surface for a suction cup is obtained, wherein the pressure difference between the ambient atmosphere and the vacuum inside the suction cup is used to enhance a tight and strong connection between the suction cup and the sealing ring in the holding position of the suction cup.

A structurally advantageous embodiment foresees that the groove has a cross-sectional profile mouthing outwardly in a substantially radial extension from a bottom of the groove located inside of the mouth. In this preferred embodiment, the flexibility and extensibility of the sealing ring can help to facilitate assembly of the elements.

A locking connection can advantageously be achieved by adapting the cross-sectional profile of the sealing ring lip to the groove, the lip's profile comprising a swelling that engages the bottom region of the groove. This way, the parts of the suction cup can be snapped together in a form fitting engagement, and preferably in a removable connection.

In a preferred embodiment the groove is limited by the opposing upper and lower walls running between the mouth and the bottom of the groove. An additional locking means can be provided if the lower wall is formed with a heel that extends into the groove and which in the mounted position engages a corresponding recess formed in the surface of the sealing ring.

In a preferred development of the invention, a suction cup comprises at least two elements from a set of mutually connectable, preferably detachably connectable elements in the form of sealing ring, bellows and end piece. The elements comprises coupling means of complementary shape formed integrally therewith, preferably having rotational symmetrical shape, and arranged for a form fitting engagement between coupled elements, whereby the elements can be combined as desired since the coupling means of all elements comprise a common interface.

This interface consists of uniformly shaped contact surfaces, on one hand formed on the inside of a first element in the form of a circumferentially running groove, and on the other hand formed on the outer side of a second element in the form of a circumferentially running lip which is insertable into the groove, the main extension of the contact surfaces being radial in relation to the longitudinal axis of the elements.

Said groove mouths in the outer side of the element and extends to a groove bottom located radially inside of the mouth, and this groove bottom preferably having a widened cross-section with respect to the mouth adapted to a correspondingly shaped swelling at the tip of the lip which is insertable into the groove.

The widened bottom of the groove, as well as the swelling of the lip, both preferably have a semi-circular cross section in an axial plane through the centre of the elements. The semi-circular shape of the groove co-operates with a partially toroid-shaped inner periphery of the sealing ring, this way effective to force the latter to be fully inserted for a correct positioning in the groove.

Between the mouth and the bottom of the groove, the groove is defined between axially spaced and mutually opposite upper and lower walls, wherein preferably at least the lower wall has a heel which extends into the groove and which in the mounted position engages a corresponding recess formed in the lower side of the lip that is insertable into the groove.

In result primarily o the aforesaid compatibility between the elements there is provided a system which allows the assembly of elements for the formation of suction cups which are adapted for different applications. Thus, in this way a suction cup may be formed comprising an end piece and a sealing ring, or a suction cup comprising an end piece, a bellows and a sealing ring, and also suction cups comprising an end piece, two or more bellows and a sealing ring.

Consequently the invention also comprises an end piece for a suction cup, the end piece being arranged for connection to a vacuum source and comprising a circumferentially running and on the outer side of the end piece integrally formed coupling means which is arranged to provide a form fitting engagement with a correspondingly shaped coupling means arranged on a bellows or on a sealing ring.

Correspondingly the invention also comprises a bellows for a suction cup, the bellows comprising a circumferentially running coupling means formed integrally in the inner periphery of the upper end of the bellows, as well as a circumferentially running coupling means formed integrally in the outside of the lower end of the bellows, each of said coupling means arranged to provide a form fitting engagement with correspondingly shaped coupling means arranged in a end piece, or in a sealing ring, or in another bellows.

Likewise, the invention also comprises a sealing ring for a suction cup, the sealing ring comprising a circumferentially running coupling means formed integrally on the inner periphery of the sealing ring and arranged to provide a form fitting engagement with correspondingly shaped coupling means arranged in an end piece or in a bellows.

BRIEF DESCRIPTION OF THE DRAWINGS

The invention will be explained more closely below with reference made to the appended drawings, in which an embodiment of the suction cup is shown schematically. In the drawings, FIG. 1 is a longitudinal cross-section through the centre of a suction cup according to the invention, in a basic first embodiment, FIG. 2 shows the parts of the suction cup in the unassembled state, in a corresponding cross-section;

FIGS. 4a-4b show a corresponding cross-section through another alternative embodiment of the suction cup according to the invention.

DETAILED DESCRIPTION OF A PREFERRED EMBODIMENT

Figure 3B:
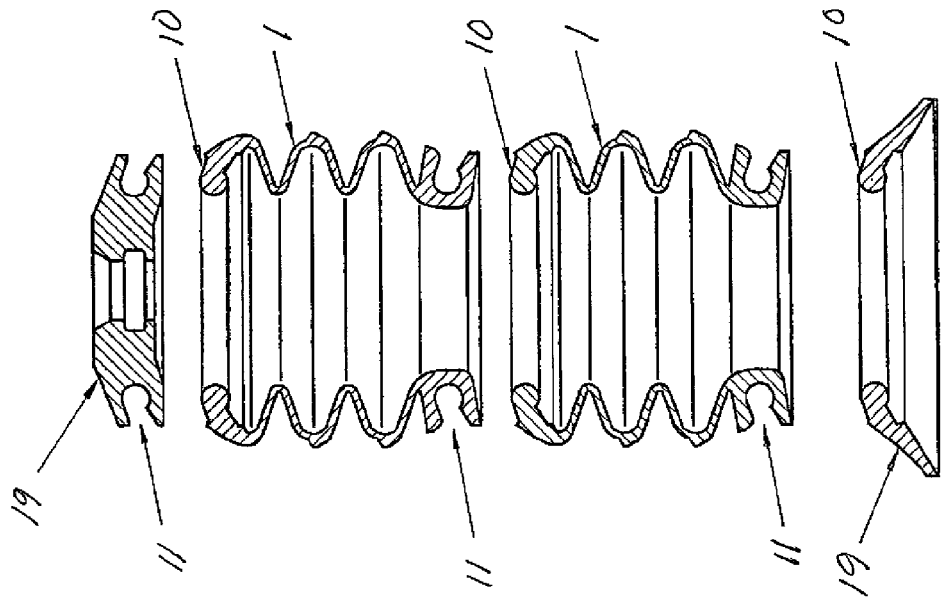
FIGS. 3a-3b show an alternative embodiment of the invention in assembled and unassembled states, respectively, likewise in a longitudinal cross-section through the centre of the suction cup and its individual elements.

Basically, a suction cup according to the illustrated embodiment comprises a bellows 1 having a sealing surface arranged on a separate and from the bellows detachable sealing ring 2. The bellows 1 is in a first or upper end formed with an end piece that is arranged to be brought in fluid flow communication with a vacuum source, to which purpose the end piece has a connection 3 which may be in a manner known per se to the person skilled in the art in order to allow the direct or indirect mounting of the suction cup to a vacuum supplied tool (not shown). In its second, opposite or lower end 4 the bellows 1 is arranged for receiving the sealing ring 2.

The sealing ring 2 (see also FIG. 2) is embodied as a ring having a sealing surface 5 arranged between an outer periphery 6 and a radially inner periphery 7, defining an opening 8 through the sealing ring. The sealing ring advantageously comprises a wall 9 the thickness of which is reducing towards the outer periphery, and an oval or rotationally symmetric basic shape adapted to the bellows.

The material of the bellows and of the sealing ring can be chosen independently of each other and comprises typically natural rubber, synthetic rubber, polymers and polymer blends with the appropriate characteristics in terms of durability, elasticity and flexibility. The parts of the suction cup may be produced in any die cast procedure known to a person skilled in the art.

In its inner peripheral region 7, the sealing ring 2 is formed with a lip 10 that is insertable in a groove 11 which is formed in the lower end of the bellows 1, the groove 11 running circumferentially about the bellows. The groove 11 opens outwardly and has a substantially radial direction and cross-sectional profile extending between mouth 12 and a bottom 13 of the groove 11. A substantially radial direction as used here means that the radial dimension of the groove is greater than its axial dimension, in relation to the longitudinal direction of the bellows and the centre axis C. In a preferred embodiment, the groove has a widened groove bottom 13 which receives a correspondingly shaped swelling 14 arranged at the tip of the sealing ring lip 10. A preferred embodiment foresees that a portion of the groove's bottom region has a partially circular shape, when seen in a longitudinal cross-section through the centre of the suction cup, and this portion of the groove includes at least a part of a circle greater than half a circle, and the inner periphery 7 of the sealing ring includes an essential portion of a circle, at least a portion thereof that is greater than half a circle. The groove is limited by an upper wall 15 and a lower wall 16 which runs axially separated between the mouth 12 of the groove and its bottom 13. At least the lower wall 16 is preferably formed with a heel 17 which extends into the groove 11 for engagement with a correspondingly shaped recess 18 arranged in the lower side of the sealing ring. Also if not illustrated herein, the upper wall can be formed with a protrusion that extends into the groove 11 for engagement with a correspondingly shaped recess in the upper side of the sealing ring.

The bellows 1 and the sealing ring 2 typically has a rotationally symmetric basic shape, and the above described coupling means 10 and 11 preferably run continuously about a common longitudinal axis of the bellows and the sealing ring. Alternatively, the inventive solution can be realized in other basic shapes of the elements forming the suction cup, such as oval or polygonal shapes, and the coupling means may alternatively have a partially interrupted extension in the circumferential direction of the elements, and may for example have a length of other cross-sectional shape, but should essentially run completely around the corresponding element forming the suction cup.

By these measures, the bellows and the sealing ring are arranged to be connected in a form-fitting engagement and a radially overlapping relation in the region of engagement, in FIG. 1 illustrated through the radial length r. Any additional attachment means for securing the connection is not required, because the ambient pressure during operation imposes a clamping force on the connection region that ensures the sealing ring's engagement with the bellows.

Figure 3A:
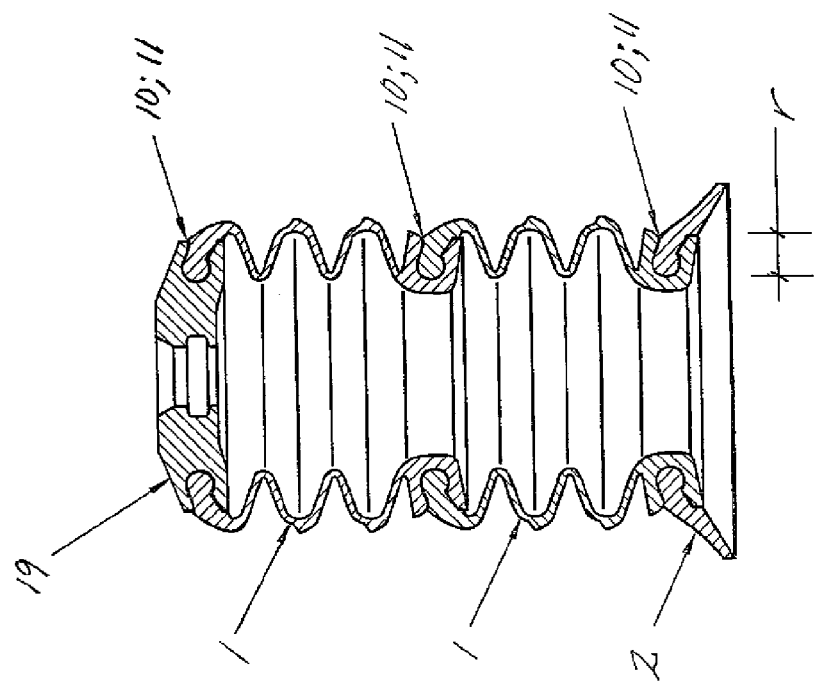

With reference to FIGS. 3a-3b, a further developed embodiment of the invention comprises a set of mutually compatible elements which are designed to be combined as desired to form suction cups of various embodiments. The set of elements includes at least one bellows 1, a sealing ring 2, and a separate end piece 19 which is designed to establish fluid flow communication with a vacuum source. Compatibility is provided in that each element comprises integrally and to each other complementary formed coupling means 10, 11 which preferably are shaped as described above. The elements are optionally combinable as the coupling means comprises one singular interface which is common for all elements. This interface is formed by the surfaces in contact in the coupling region, i.e. the outer side of the lip 10 and the inner side of the groove 11. In the coupled position, the contact surfaces provide a form-fitting engagement, and are for this purpose equally shaped in such a way that they are mirror images of each other. The main directions of the contact surfaces are radial with respect to the longitudinal axis of the subject element. In the region of the groove bottom 13 and the swelling 14 of the lip, the interface preferably has a rounded part-circular cross-section, as seen in an axial plane through the centre of the element.

In alternative embodiments of the combination illustrated in FIGS. 1-3 comprising end piece, bellows and sealing ring, the sealing ring may alternatively be directly coupled to the end piece, as shown in FIGS. 4a-4b, or, where appropriate, via more interconnected bellows than those two which are shown in FIGS. 3a-3b.

The above described embodiment is preferred and provides a suction cup that meets the stated purpose, which by the replaceable sealing ring also provides extended lifetime, and can freely be combined to form a suction cup with the desired properties of the bellows and the sealing surface respectively. It shall be realized that the components of the suction cup and coupling means are designed to provide detachable connections between the components, and that nevertheless the components can be permanently connected, such as by gluing. It should also be realized that details of the illustrated embodiments can be modified without departing from the principles of the presented solution.

The invention claimed is:

1. A suction cup for a vacuum powered tool, the suction cup comprising:
   a first or upper end configured to be brought into fluid flow communication with a vacuum source;
   a second or lower end opposite the first end and configured to be brought tightly into contact with a surface of an object to be handled by the vacuum powered tool;
   a sealing ring comprising a means for coupling formed integrally therewith and running circumferentially about an inner periphery of the sealing ring;
   at least one bellows comprising a first means for coupling formed integrally therewith and running circumferentially about an inner periphery in an upper end of the bellows, and a second means for coupling formed integrally therewith and running circumferentially about an outer periphery in a lower end of the bellows; and
   an end piece comprising a means for coupling formed integrally therewith and running circumferentially about an outer periphery of the end piece,
   wherein the means for coupling of the sealing ring is configured to selectively provide a form fitting engagement with another correspondingly-shaped one of the means for coupling of the end piece and the at least one bellows,
   the means for coupling of the end piece is configured to selectively provide a form fitting engagement with another correspondingly-shaped one of the means for coupling of the at least one bellows and the sealing ring,
   each of the first and second means for coupling of one of the at least one bellows is configured to selectively provide a form fitting engagement with another correspondingly-shaped one of the means for coupling of the end piece, the sealing ring, and another of the at least one bellows,
   the sealing ring, the at least one bellows, and the end piece form a set of connectable elements that are mutually connectable with one another, and
   each one of the means for coupling has a complementary shape with respect to other ones of the means for coupling and forms an interface that is common for all connections between the mutually-connectable elements in the set.

2. The suction cup according to claim 1, wherein the sealing ring is a circular ring having a wall with a thickness reducing towards the outer periphery.

3. The suction cup according to claim 1, wherein each of the means for coupling comprises at least one of a circumferentially running groove defined between opposite upper and lower walls and having an outwardly mouthing cross-sectional profile with a mainly radial extension towards a bottom region of the groove located inside of a mouth, and a lip that is adapted to the groove for engagement with the bottom region of the groove, the lip being insertable in the groove under form fitting engagement and in a mutually radially overlapping relationship between the lip and the groove in the region of engagement.

4. The suction cup according to claim 3, wherein the groove has a widened bottom region, and the lip has a correspondingly shaped swelling.

5. The suction cup according to claim 4, wherein the bottom region of the groove has a semi-circular cross-section, and the lip has, at least partially, a toroidal shape.

6. The suction cup according to claim 5, wherein at least the lower wall of the groove has a heel extending into the groove and in the coupled position engaging a corresponding recess formed in the lower side of the lip.

7. The suction cup according to claim 4, wherein at least the lower wall of the groove has a heel extending into the groove and in the coupled position engaging a corresponding recess formed in the lower side of the lip.

8. The suction cup according to claim 3, wherein at least the lower wall of the groove has a heel extending into the groove and in the coupled position engaging a corresponding recess formed in the lower side of the lip.

9. A suction cup for a vacuum powered tool, the suction cup comprising:
   a first or upper end configured to be brought into fluid flow communication with a vacuum source;
   a second or lower end opposite the first end and configured to be brought tightly into contact with a surface of an object to be handled by the vacuum powered tool;
   a sealing ring comprising a coupling portion formed integrally therewith and running circumferentially about an inner periphery of the sealing ring;
   at least one bellows comprising a first coupling portion formed integrally therewith and running circumferentially about an inner periphery in an upper end of the bellows, and a second coupling portion formed integrally therewith and running circumferentially about an outer periphery in a lower end of the bellows; and
   an end piece comprising a coupling portion formed integrally therewith and running circumferentially about an outer periphery of the end piece,
   wherein the coupling portion of the sealing ring is configured to selectively provide a form fitting engagement with another correspondingly-shaped one of the coupling portion of the end piece and the at least one bellows, the coupling portion of the end piece is configured to selectively provide a form fitting engagement with another correspondingly-shaped one of the coupling portion of the at least one bellows and the sealing ring, each of the first and second coupling portions of one of the at least one bellows is configured to selectively provide a form fitting engagement with another correspondingly-shaped one of the coupling portions of the end piece, the sealing ring, and another of the at least one bellows, the sealing ring, the at least one bellows, and the end piece form a set of connectable elements that are mutually connectable with one another, and each one of the coupling portions has a complementary shape with respect to other ones of the coupling portions and forms an interface that is common for all connections between the mutually-connectable elements in the set.

* * * * *